United States Patent [19]

Möthrath et al.

[11] Patent Number: 4,913,046
[45] Date of Patent: Apr. 3, 1990

[54] BREAD TOASTER WITH TEMPERATURE SENSOR

[75] Inventors: Georg Möthrath, Hasselroth; Stefan Schamberg, Oberursel, both of Fed. Rep. of Germany

[73] Assignee: Braun Aktiengesellschaft, Kronberg, Fed. Rep. of Germany

[21] Appl. No.: 403,076

[22] Filed: Aug. 29, 1989

Related U.S. Application Data

[63] Continuation of Ser. No. 170,319, Mar. 18, 1988, abandoned.

[30] Foreign Application Priority Data

Mar. 24, 1987 [DE] Fed. Rep. of Germany ....... 3709571

[51] Int. Cl.⁴ ............................................. A47J 27/62
[52] U.S. Cl. ........................................ 99/331; 99/385; 99/334; 374/121; 374/149
[58] Field of Search ............................................ 99/334

[56] References Cited

U.S. PATENT DOCUMENTS

| 1,734,837 | 11/1929 | Thwing | 374/130 |
| 2,631,523 | 3/1953 | Olving | 99/326 |
| 3,828,559 | 8/1974 | Siemensma | 99/326 |
| 4,286,134 | 8/1981 | Nakata et al. | 374/121 |
| 4,396,825 | 8/1983 | Cox et al. | 99/389 |
| 4,718,332 | 1/1988 | Möthrath | 99/385 |
| 4,722,612 | 2/1988 | Junkert et al. | 250/339 |
| 4,727,799 | 3/1988 | Oshima et al. | 99/331 |

FOREIGN PATENT DOCUMENTS

| 1515042 | 7/1972 | Fed. Rep. of Germany . | |
| 3424585A1 | 2/1985 | Fed. Rep. of Germany | 99/385 |
| 3516553A1 | 11/1986 | Fed. Rep. of Germany | 99/385 |

*Primary Examiner*—Allan N. Shoap
*Assistant Examiner*—Jeffrey J. Hohenshell
*Attorney, Agent, or Firm*—Fish & Richardson

[57] ABSTRACT

The invention proposes a temperature measuring device for a bread toaster, with a sensing element (1) which is in communication with the toasting chamber (25) through a radiation guide channel (A, B, C, D). The radiation guide channel (A, B, C, D) is formed of several passageways (11, 12, 13) arranged in spaced apart serially disposed partition walls (4, 6, 8).

13 Claims, 2 Drawing Sheets

BREAD TOASTER WITH TEMPERATURE SENSOR

This application is a continuation of 07/170,319 filed 3/18/88, now abandoned.

This invention relates to a temperature measuring device, in particular for bread toasters.

A temperature measuring device of this type is known from DE-AS 15 15 042. This known temperature measuring device includes a tubular radiation directing means forming a guide channel for part of the thermal radiation emitted from the article being measured. That portion of the thermal radiation that is used for measurement enters through a window which is directed towards the article to be measured into the radiation guide channel which directs the radiation to a heat-responsive sensing element arranged in the radiation guide channel. In this arrangement, the thermal radiation emitted from the article being measured—in this case, the article being toasted—and applied to the sensing element is used for determining the surface temperature of the article being measured. Direct contact between the sensing element and the surface of the article being toasted is not necessary.

This known temperature measuring device has, however, the disadvantage that the walls of the tubular radiation guide channel, and thus the close air and, as a result of heat conduction, also the sensor installed at the end of the radiation guide channel heat up with the frequency of the measuring operations, whereby the measuring result is corrupted. Correspondingly, the measuring accuracy of the known temperature measuring device deteriorates with the frequency of successive measurement cycles.

It is, therefore, an object of the present invention to provide a temperature measuring device—which is particularly suitable for use in bread toasters—which affords improved measuring accuracy.

In accordance with the invention, the radiation guide channel is formed of a series of passageways arranged on an axis in spaced apart serially disposed partition plates. In consequence, the radiation guide channel is not comprised of a unitary tubular body transferring heat energy by heat conduction to the sensing element. Rather, air cushions serving to block heat conduction are formed between the individual partition walls. Equally, the individual partition walls act as shields against interfering thermal radiation, that is, each subsequent partition wall arranged in the direction of the sensing element acts as heat shield for the preceding hotter partition wall.

In particular, the temperature measuring device of the invention affords the advantage of permitting an exchange of air between the individual partition walls, whereby superposition of interfering radiation is considerably reduced. This exchange of air is particularly advantageous for the sensing element because otherwise the still air enveloping the sensing element and thereby also the sensor itself become gradually heated, resulting in a false measuring signal.

In an improvement of the invention (claim 2), the edges of the passageways of the partition walls are coated with materials of low emissivity. The coating has the advantage of reducing the emissive power of the bore and its edge areas in cases where, for reasons of design, the partition walls are made of materials—for example, plastics—of high emissivity. Therefore, the coating is advantageously suited to the reduction of the portion of interfering radiation emitted from the edges of the passageways into the radiation guide channel direct.

The passageways may also be provided with guards made of a material of low emissivity for which purpose polished nickel with its low emissive power is well suited. Further advantageous improvements of the invention will become apparent from other subclaims.

The invention will be described in more detail in the following with reference to the accompanying drawings. In the drawings, FIG. 1 is a sectional view of a bread toaster illustrating by way of example the application of the temperature measuring device of the invention;

Figure 1:
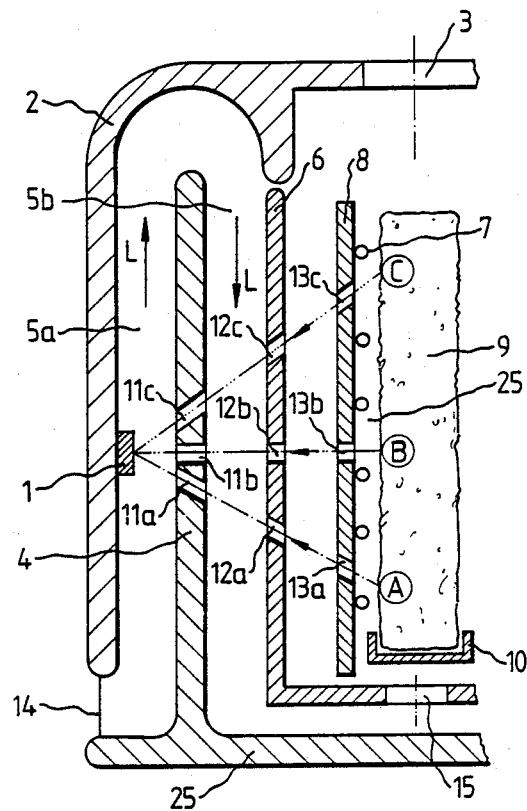

FIG. 1 illustrates an application example of the temperature measuring device of the invention in a bread toaster. The bread toaster is shown in section illustrating only a fragment thereof. To cool the outer walls of the bread toaster, flow channels are formed on the inside of the outer casing walls. A sensing element 1 responsive to thermal radiation is mounted on the inside of the outer casing wall 2 of the bread toaster. Starting from the sensing element 1, further partition walls are provided in the direction of the article 9 being measured—for example, a slice of bread. The first partition wall 4 cooperates with the outer casing wall 2 to provide an upward flow channel 5a for an air current L entering through an air intake opening 14 in the bottom area of the bread toaster. Further, the first partition wall 4 cooperates with a second partition wall 6 to provide the downward flow channel 5b for the air current L. In a known manner, the second partition wall 6 is preferably of sheet metal. The second partition wall 6 is followed by a further partition wall 8 serving as an insulating body on which the heat conductors 7 for the toaster heating unit are mounted. The heat conductors 7 are directed towards the article to be toasted which is received in a toasting chamber 25. To introduce and remove the article 9 to be toasted, a feed/discharge opening 3 is provided on the upper side of the bread toaster and a slide rack 10 holding the bread is disposed inside the bread toaster. The air current L flowing in flow channel 5a, 5b enters the toasting chamber 25 through an outlet opening 15 provided at the base of the partition wall 6.

The partition walls 4, 6 and 8 include each three passageways 11, 12 and 13, respectively, configured as bores and referred to by lower-case letters a, b and c for additional identification, with all bores carrying the same lower-case letter lying on a common straight line. Accordingly, for example, the three bores 11a, 12a, 13a provide a radiation guide channel extending from the surface of the article to be toasted at point "A" in a straight line to the heat-responsive sensing element 1. Similarly, the embodiment of FIG. 1 provides two further radiation guide channels, identified by lower-case letters "b" and "c" which extend from the points "B" and "C" on the surface of the article to be toasted to the heat-responsive sensing element 1. For better distinction, the three radiation guide channels are shown in dot-and-dash lines, with the number of dots differing. As becomes apparent from FIG. 1 further, the three radiation guide channels extend to the sensing element 1 at different angles. As a result, the first radiation guide channel (illustrated with a single dot in the dot-and-dash line) detects the lower surface area of the item being toasted (point "A"). The center radiation guide channel (illustrated with two dots in the dot-and-dash line) detects the center area of the article 9 being toasted (point "B"), whilst the upper radiation guide channel (illustrated with three dots in the dot-and-dash line) detects the upper area (point "C") of the item 9 being toasted. In a modification of this embodiment, it is possible to provide for the three radiation guide channels three sensing elements instead of the single sensing element 1. In this event, the radiation guide channels may extend parallel to each other, for example.

When the heating unit of the bread toaster is activated, the heat conductor 7 has a temperature of, for example, 900° C. on completion of the heating cycle. The high temperature of the bread toaster heating unit and the resulting thermal radiation emitted cause the surface temperature of the article being toasted to rise to values of between 100° C. and 200° C. whereby the surface of the article being toasted caramelizes in known fashion. In view of the high emissive power of the item being toasted, the surface of this item acts as a heat radiator. This thermal radiation is supplied to the sensing element 1 through the three radiation guide channels previously described. Because the intensity of heat radiation increases with the degree of toasting increasing, it can be clearly determined when the set and desired degree of doneness is reached. Because of the low reflectivity of the article being toasted, a relatively low amount of thermal radiation stemming from the heating unit of the bread toaster is directed into the radiation guide channels as a result of reflection by the surface of the article being toasted.

Also, the partition wall 8 carrying the insulating material acts as a heat shield so that a relatively small amount of the thermal radiation emitted from the heating unit is allowed to expand in the direction of the sensing element 1. With regard to the thermal radiation emitted by the partition wall 8 in the direction of the sensing element 1, the partition wall 6 functions as a first heat shield. As regards the heat radiated from the partition wall 6 in the direction of the sensing element 1, the partition wall 4 acts a further heat shield.

In view of the fact that an air current occurs between the individual partition walls 4, 6, 8 which acts to inhibit heat conduction, also the conduction of heat in the direction of the sensing element 1 is largely prevented. As indicated in FIG. 1 by the air current L, the air flows preferably between the individual partition walls. Even after prolonged operation with the heat conductor at a temperature of about 900° C., the partition wall 4 heats only to a temperature of between 50° C. and 70° C. and the casing wall 2 to a temperature of between 20° C. and 30° C. The path of the air current L affords the further advantage of also cooling the sensing element 1 which is thus at an approximately constant operating temperature.

Although the temperature measuring device described so far has been described by way of example in combination with a bread toaster for making its mode of operation clear, it is to be understood that this temperature measuring device may also be used in other apparatus. Thus, for example, the temperature measuring device of the invention may also be used for determining the winding temperature of electric motors.

Figure 2:
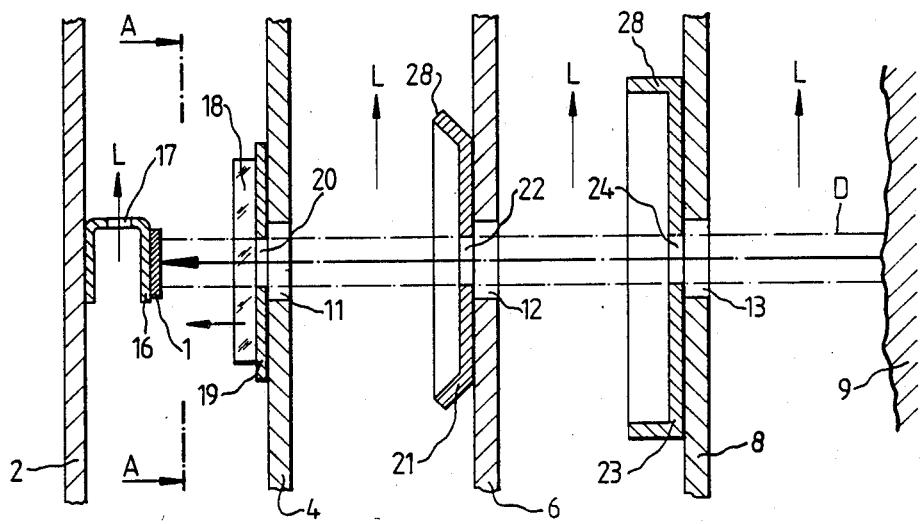
FIG. 2 is a schematic representation of the temperature measuring device of the invention with the added provision of guards of different configurations.

FIG. 2 illustrates schematically the temperature measuring device of the invention including the guards described in the following. As in the bread toaster described with reference to FIG. 1, the number of partition walls or casing walls is not limited to the number of walls illustrated.

In the event that the partition walls 4, 6, 8 are made of plastics, for example, they have a high emissivity. This high emissivity may be the reason that the partition walls, in particular in the area of the bores, introduce an interfering radiation in the radiation guide channel identified by "D" (shown in dot-and-dash line). For this reason, preferably the edge areas of the bores 11, 12, 13 in the partition walls 4, 6, 8, which bores form the radiation guide channel D, are lined with a material of low emissivity. For this purpose, for example, an annular guard 19 whose surface is of polished nickel is mounted on the partition wall 4 in the area of the bore 11.

The guards may be fastened, for example, by adhesives, rivets, etc. As shown in FIG. 2, the radiation guide channel D extends from the item 9 being measured to the sensor 1, and all guards 19, 21, 23 are fitted to the side of the partition walls 4, 6, 8 facing the sensor 1. In a modification of the embodiment of FIG. 2, the guards 19, 21, 23 may be provided on either side, rimming and lining the edge of the bores 11, 12, 13 in the partition walls 4, 6, 8. Preferably, the areas of the apertures 20, 22, 24 of the guards 19, 21, 23 are smaller than the bores 11, 12, 13 in the partition walls 4, 6, 8 to ensure that the edges of the bores 11, 12, 13 are shielded in the direction of the sensing element 1. In a modification of FIG. 2, it is also possible to make the areas of the bores 11, 12, 13 progressively smaller in the direction of the sensing element 1, for example, so that the areas of the bores 11, 12, 13 in the partition walls 4, 6, 8 are not identical.

Preferably, the bores 13 in the partition wall 8 are configured such that the heating elements 7 are still shielded in the direction of the sensing element 1 by the partition wall 8. To obtain a maximum possible signal, the bores in the partition walls 4, 6 and 8 are preferably configured such as to make allowance for the sensitivity of the sensing element 1 in dependence on the angle of incidence of the thermal radiation.

The guards 21, 23 differ from the guard 19 in that they have their edge 28 lifted clear of the partition wall in curved-forward fashion to increase the shielding effect. The curved edge 28 of the guards 21 and 23 may also serve to rim and secure a filter 18 which in FIG. 2 is glued to the guard 19 by way of example. The filter 18 is so designed as to reflect the thermal radiation emitted by the heating elements 7 into the radiation guide channel D, whereas it allows the passage of the radiation emitted by the item being toasted. For example, the filter 18 is configured such that it transmits thermal radiation of the wavelengths $\lambda$ greater than 7 $\mu$m and reflects thermal radiation of the wavelengths $\lambda$ smaller than 7 $\mu$m. This represents a good compromise in that on the one hand the radiation emitted by the heat conductors which have a temperature of about 900° C. is largely filtered out (the maximum of radiant power is at about 2.5 $\mu$m), while on the other hand the radiation emitted by the item being toasted is allowed to pass in sufficient amounts (at 200° C. the maximum of radiant power is at about 6 $\mu$m). The filter 18 may have only a very low absorptive power in the entire relevant wavelength spectrum, because otherwise the increase in temperature which would occur as a result of absorbed heat radiation would produce an interfering radiation directly affecting the sensing element 1.

As in FIG. 1, an air current L may flow between the individual partition walls 4, 6,8 which prevents an accumulation of heat and, as shown in FIG. 2 by way of example, flows through all spaces in one direction. This air current L may also serve the function of cooling the sensing element 1 which is arranged in the space between the casing wall 2 and the partition wall 4.

In FIG. 2, the sensing element 1 is not attached directly to the inside of the casing wall 2 but is mounted on a bracket 16. To avoid heat accumulation, the bracket 16 which, for example, is of U-shape, may be provided with a vent 17 as shown in FIG. 1 to allow the passage of the air current L.

Figure 3:
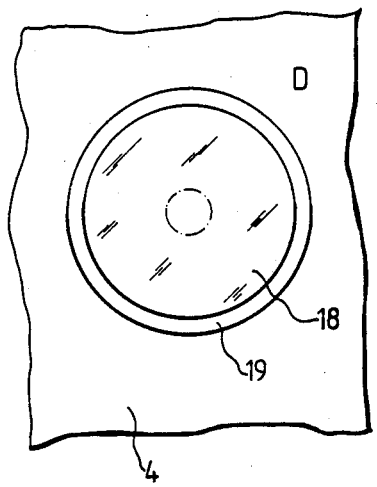
FIG. 3 is a top plan view of a partition wall along the line A—A of FIG. 2.

FIG. 3 shows a top plan view of the partition wall 4 of FIG. 2 along the line A—A. The partition wall 4 is only illustrated in fragment and, as shown in FIG. 3, the radiation guide channel D, the filter 18 and the guard 19 are of round shape. Depending on the sensitivity of the sensing element as a function of the angle of incidence of the heat radiation incident thereon, the round radiation guide channel D may also be shaped differently.

While the embodiments described in the foregoing show partition walls 4, 6, 8 of plane configuration, it should be understood that also such embodiments are possible in which the partition walls 4, 6,8 are, for example, curved in concave fashion in the direction of the item 9 to be toasted.

Figure 4:
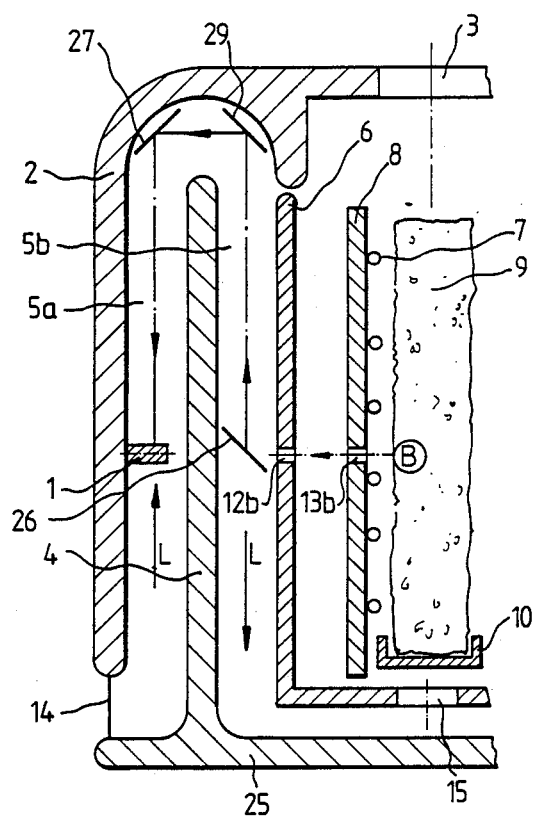
FIG. 4 is a sectional view of the bread toaster of FIG. 1 in which the radiation guide channel is deflected by means of mirrors.

Also, in the embodiments described it has been understood by way of example that the radiation guide channel D extends from the item 9 to be toasted to the sensing element 1 in a straight line, with the bores 13 forming the radiation inlet openings and the bores 11 of the partition wall or the aperture 20 of the guard 19 forming the radiation outlet openings of the radiation guide channel D. In a modification of this arrangement, however, it is also possible to provide in one of the spaces between two partition walls a reflector causing a change in the direction of radiation of the radiation guide channel. Because the radiation guide channel D is formed by bores 11, 12, 13 provided in spaced apart, single partition walls 4, 6, 8, it is extremely simple to effect this change in direction and to mount suitable reflectors. Thus, FIG. 4 shows an embodiment with only one radiation guide channel in which the thermal radiation, after leaving the partition wall 6, is directed to a sensing element 1 by means of three reflectors 26, 27, 29 each inclined at an angle of 45° relative to the incident heat radiation, the deflected radiation impinging vertically on the area of the sensing element which is responsive to heat radiation. To concentrate the thermal radiation incident upon the sensing element 1, it is also possible to substitute concave reflectors for the plane reflectors.

We claim:

1. A bread toaster comprising
structure defining a toasting chamber for receiving a bread product item to be toasted, said toasting chamber defining structure including an electrically insulating partition wall,
heating means disposed on the side of said electrically insulating partition wall facing said toasting chamber,
an outer casing surrounding said toasting chamber defining structure, a supplementary partition wall disposed between said outer casing and said electrically insulating partition wall, and
a sensing element disposed on the side of said supplementary partition wall remote from said toasting chamber, said partition walls including a series of apertures therein that define a radiation guide channel extending between said toasting chamber and said sensing element, edge areas of said apertures being coated with a layer of material having a low emissivity.

2. A bread toaster comprising
structure defining a toasting chamber for receiving a bread product item to be toasted, said toasting chamber defining structure including an electrically insulating partition wall,
heating means disposed on the side of said electrically insulating partition wall facing said toasting chamber,
an outer casing surrounding said toasting chamber defining structure, a supplementary partition wall disposed between said outer casing and said electrically insulating partition wall, and
a sensing element disposed on the side of said supplementary partition wall remote from said toasting chamber, said partition walls including a series of apertures therein that define a radiation guide channel extending between said toasting chamber and said sensing element, edge areas of said apertures being covered with guards of polished nickel.

3. A bread toaster comprising
structure defining a toasting chamber for receiving a bread product item to be toasted, said toasting chamber defining structure including an electrically insulating partition wall,
heating means disposed on the side of said electrically insulating partition wall facing said toasting chamber,
an outer casing surrounding said toasting chamber defining structure, a supplementary partition wall disposed between said outer casing and said electrically insulating partition wall, and
a sensing element disposed on the side of said supplementary partition wall remote from said toasting chamber, said partition walls including a series of apertures therein that define a radiation guide channel extending between said toasting chamber and said sensing element, and edge areas of said apertures being covered with guards of dish- or cup-shaped configuration.

4. A bread toaster comprising
structure defining a toasting chamber for receiving bread product to be toasted including an electrically insulating partition wall,
heating means disposed on the side of said electrically insulating partition wall facing said toasting chamber,
an outer casing surrounding said toasting chamber defining structure, a supplementary partition wall disposed between said outer casing and said electrically insulating partition wall, and
a sensing element disposed on the side of said supplementary partition wall remote from said toasting chamber, said partition walls including a series of apertures therein that define a radiation guide channel extending between said toasting chamber and said sensing element, said electrically insulating and supplementary partition walls being so arranged that a flow channel is formed between said electrically insulating and supplementary partition walls and, between said outer casing and said supplementary partition wall, into which flow channel an air current (L) enters through an air intake opening provided in said outer casing, said air current exiting into said toasting chamber through an air outlet opening provided in said electrically insulating partition wall and a series of reflectors in said flow channel for deflecting thermal radiation along said radiation guide channel.

5. A bread toaster comprising structure defining a toasting chamber for receiving bread product item to be toasted including an electrically insulating partition wall, heating means disposed on the side of said electrically insulating partition wall facing said toasting chamber, an outer casing surrounding said toasting chamber defining structure, a supplementary partition wall disposed between said outer casing and said electrically insulating partition wall, said electrically insulating and supplementary partition walls being arranged so that a first air flow channel is formed therebetween and said supplementary partition wall and said outer casing being arranged so that a second air flow channel is formed therebetween, and a sensing element disposed on the side of said supplementary partition wall remote from said toasting chamber, said electrically insulating partition wall having a first aperture therein, said supplementary partition wall having a second aperture therein, said first and second apertures being aligned with said sensing element and defining a radiation guide path that extends across said first and second air flow channels between said toasting chamber and said sensing element, such that air flow in said first and second flow channels is unobstructed and provides dynamic thermal isolation between said toasting chamber and said sensing element, said electrically insulating and supplementary partition walls being so arranged that an air current (L) enters through an air intake opening provided in said outer casing for flow through said first and second air flow channels, said air current exiting into said toasting chamber through an air outlet opening provided in said electrically insulating partition wall.

6. A bread toaster comprising structure defining a toasting chamber for receiving a bread product item to be toasted, said toasting chamber defining structure including an electrically insulating partition wall, heating means disposed on the side of said electrically insulating partition wall facing said toasting chamber, an outer casing surrounding said toasting chamber defining structure, a supplementary partition wall disposed between said outer casing and said electrically insulating partition wall, said electrically insulating and supplementary partition walls being arranged so that a first air flow channel is formed therebetween and said supplementary partition wall and said outer casing being arranged so that a second air flow channel is formed therebetween, and a sensing element disposed on the side of said supplementary partition wall remote from said toasting chamber, said electrically insulating partition wall having a first aperture therein, said supplementary partition wall having a second aperture therein, said first and second apertures being aligned with said sensing element and defining a radiation guide path that extends across said first and second air flow channels between said toasting chamber and said sensing element such that air flow in said first and second flow channels is unobstructed and provides dynamic thermal isolation between said toasting chamber and said sensing element.

7. A bread toaster as claimed in claim 6 comprising structure defining a toasting chamber for receiving a bread product item to be toasted, said toasting chamber defining structure including an electrically insulating partition wall, heating means disposed on the side of said electrically insulating partition wall facing said toasting chamber, an outer casing surrounding said toasting chamber defining structure, a supplementary partition wall disposed between said outer casing and said electrically insulating partition wall, and a sensing element disposed on the side of said supplementary partition wall remote from said toasting chamber, said partition walls including a series of apertures therein that define a radiation guide channel extending between said toasting chamber and said sensing element, the edges of said apertures being covered by guards having a low emissity.

8. A bread toaster as claimed in claim 7 wherein said guards have openings that are smaller than the areas of the apertures in said partition walls.

9. A bread toaster as claimed in claim 6 and further including a filter provided between said sensing element and a partition wall, said filter largely reflecting the radiation emitted by said heating means while transmitting radiation emitted by the item being toasted.

10. A bread toaster as claimed in claim 6 and further including a filter provided between said sensing element and a partition wall, said filter adapted to largely reflect the radiation emitted by said heating means and to transmit radiation emitted by the item being toasted in said toasting chamber.

11. The bread toaster as claimed in claim 10 wherein said filter transmits radiation of wavelength greater than about seven micrometers and reflects radiation of wavelength less than about seven micrometers.

12. The bread toaster as claimed in either claim 6 or 5 wherein said heating means is of the thermal radiation type and said sensing element is adapted to sense thermal radiation.

13. The bread toaster as claimed in claim 6 wherein at least one of said apertures in said partition walls is covered by a filter.

* * * * *